US012428260B2

(12) United States Patent
Zhang et al.

(10) Patent No.: US 12,428,260 B2
(45) Date of Patent: Sep. 30, 2025

(54) METHOD AND SYSTEM FOR CONTROLLING ROBOT TO TAKE ELEVATOR, ELEVATOR, ROBOT SYSTEM AND STORAGE MEDIUM

(71) Applicant: Otis Elevator Company, Farmington, CT (US)

(72) Inventors: Yu Zhang, Shanghai (CN); Shenhong Wang, Shanghai (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 1380 days.

(21) Appl. No.: 17/073,991

(22) Filed: Oct. 19, 2020

(65) Prior Publication Data

US 2021/0122607 A1 Apr. 29, 2021

(30) Foreign Application Priority Data

Oct. 23, 2019 (CN) ......................... 201911011415.8

(51) Int. Cl.
*B66B 1/34* (2006.01)
*B66B 1/46* (2006.01)
*B66B 5/00* (2006.01)

(52) U.S. Cl.
CPC .......... *B66B 1/3461* (2013.01); *B66B 1/3476* (2013.01); *B66B 1/468* (2013.01); *B66B 5/0012* (2013.01); *B66B 2201/4638* (2013.01); *B66B 2201/4653* (2013.01); *B66B 2201/4669* (2013.01)

(58) Field of Classification Search
CPC ..... B66B 1/3461; B66B 1/3476; B66B 1/468; B66B 5/0012
USPC .......................................................... 187/247
See application file for complete search history.

(56) References Cited

U.S. PATENT DOCUMENTS 3,795,523 A 3/1974 Moriya et al.
2012/0041593 A1 2/2012 Ichinose et al.
(Continued)

FOREIGN PATENT DOCUMENTS

CN 106276439 A 1/2017
CN 106348110 A 1/2017
CN 206457119 U 9/2017
(Continued)

OTHER PUBLICATIONS

Chinese Office Action for Application No. 201911011415.8, Issued May 1, 2024, 10 Pages.
(Continued)

*Primary Examiner* — Erick D Glass
(74) *Attorney, Agent, or Firm* — CANTOR COLBURN LLP

(57) ABSTRACT

A method for controlling a robot to take elevator, a system for controlling a robot to take elevator, an elevator system, a robot system, and a computer-readable storage medium. The method for controlling a robot to take elevator includes receiving an elevator-taking request from a robot; acquiring current passenger information in at least one elevator car; and determining whether the elevator car meets a pre-set carrying condition according to the acquired current passenger information: if yes, instructing the robot to board the elevator car in response to the elevator-taking request; otherwise, rejecting the elevator-taking request.

14 Claims, 2 Drawing Sheets

(56) References Cited

U.S. PATENT DOCUMENTS

| | | | | |
|---|---|---|---|---|
| 2019/0345000 | A1* | 11/2019 | Park | G05D 1/0297 |
| 2021/0046650 | A1* | 2/2021 | Deyle | G05D 1/0214 |

FOREIGN PATENT DOCUMENTS

| | | | |
|---|---|---|---|
| CN | 108163653 | A | 6/2018 |
| CN | 108975101 | A | 12/2018 |
| CN | 109059882 | A | 12/2018 |
| CN | 109164813 | A | 1/2019 |
| CN | 109205406 | A | 1/2019 |
| CN | 109250593 | A | 1/2019 |
| CN | 109573754 | A | 4/2019 |
| CN | 109665388 | A | 4/2019 |
| CN | 109789984 | A | 5/2019 |
| CN | 109867180 | A | 6/2019 |
| CN | 110065857 | A | 7/2019 |
| JP | H069182 | B2 | 1/1994 |
| JP | 2017220121 | A | 12/2017 |

OTHER PUBLICATIONS

European Search Report for Application No. 20203536.6; Issued Jun. 30, 2021; 10 Pages.

European Search Report for Application No. 20203536.6; Issued Mar. 24, 2025, 5 Pages.

* cited by examiner

METHOD AND SYSTEM FOR CONTROLLING ROBOT TO TAKE ELEVATOR, ELEVATOR, ROBOT SYSTEM AND STORAGE MEDIUM

FOREIGN PRIORITY

This application claims priority to Chinese Patent Application No. 201911011415.8, filed Oct. 23, 2019, and all the benefits accruing therefrom under 35 U.S.C. § 119, the contents of which in its entirety are herein incorporated by reference.

TECHNICAL FIELD OF INVENTION

The present invention relates to the technical field of elevators, and in particular, to a method for controlling a robot to take elevator, a system for controlling a robot to take elevator, an elevator system, a robot system, and a computer-readable storage medium.

BACKGROUND OF THE INVENTION

Elevators have been widely used in modern society and can bring great convenience to people's work and daily lives. At the same time, with the continuous development of robot technology, robots can now take the elevator autonomously like human, but there are still some problems and deficiencies in practical applications.

For example, since many existing robots are guided to travel by a radar-based navigation system, it is possible that these robots are not able to "clearly" see events occurring in front of and behind them, which may cause unwanted situations such as collision and conflict. This is especially the case when there are irregularly shaped objects around the robot. For another example, when a robot is taking an elevator, it may contend or conflict with other passengers in terms of elevator operation, etc., which may affect or interfere with the passengers in normally taking the elevator, reduce the comfort in taking the elevator and may cause complaints, and even bring security risks.

The content in this section is to enable a clearer description and understanding of the present invention, and it should not be considered that the content has already belonged to the prior art just because it is listed in this section.

SUMMARY OF THE INVENTION

In view of the above, the present invention provides a method for controlling a robot to take elevator, a system for controlling a robot to take elevator, an elevator system, a robot system, and a computer-readable storage medium, thereby solving or at least alleviating one or more of the problems described above as well as problems of other aspects existing in the prior art.

Firstly, according to a first aspect of the present invention, a method for controlling a robot to take elevator is provided, which comprises the steps of: receiving an elevator-taking request from a robot; acquiring current passenger information in at least one elevator car; and determining whether the elevator car meets a pre-set carrying condition according to the acquired current passenger information: if yes, instructing the robot to board the elevator car in response to the elevator-taking request; otherwise, rejecting the elevator-taking request.

Optionally, the method for controlling the robot to take elevator according to the present invention further comprises the step of: in case that the elevator-taking request is rejected, instructing the robot to wait in a waiting area until it is allowed to board a next elevator car, wherein the current passenger information in the next elevator car meets the carrying condition.

In the method for controlling the robot to take elevator according to the present invention, optionally, the current passenger information comprises the passenger's operation on the elevator, and a priority level of the passenger's operation on the elevator is set to be higher than a priority level of the robot's operation on the elevator.

In the method for controlling the robot to take elevator according to the present invention, optionally, the passenger's operation on the elevator comprises: sending a request to close an elevator door by the passenger; and after the request to close the elevator door is detected, rejecting a request to open the elevator door sent by the robot.

In the method for controlling the robot to take elevator according to the present invention, optionally, the elevator-taking request is sent from the robot to an elevator control system for controlling an operation of the elevator car, or sent via a robot system for controlling an operation of the robot to the elevator control system.

In the method for controlling the robot to take elevator according to the present invention, optionally, the elevator control system is arranged locally and/or in a cloud, and/or the robot system is arranged locally and/or in a cloud.

In the method for controlling the robot to take elevator according to the present invention, optionally, the passenger information is acquired by using one or more sensors including one or more of an imaging sensor, a video sensor, an acoustic sensor, an infrared sensor, a depth sensor and a weight sensor.

In the method for controlling the robot to take elevator according to the present invention, optionally, the passenger information comprises a ratio of a current load weight of the elevator car and a rated load weight thereof, and if the ratio reaches a pre-set value, the elevator-taking request is rejected.

In the method for controlling the robot to take elevator according to the present invention, optionally, a range of the pre-set value is 15%-30%.

In the method for controlling the robot to take elevator according to the present invention, optionally, the robot is arranged in a hallway and/or on at least one floor of an elevator installation place, and the robot is in wireless communication with an elevator control system for controlling an operation of the elevator car and/or a robot system for controlling an operation of the robot.

Secondly, according to a second aspect of the present invention, a system for controlling a robot to take elevator is provided, which comprises a processor and a storage for storing instructions, wherein when the instructions are executed, the processor implements the method for controlling a robot to take elevator according to any one of the above described.

In addition, according to a third aspect of the present invention, an elevator system is also provided, which comprises: an elevator having at least one elevator car; and a system for controlling a robot to take elevator, which is in communication with the elevator and comprises a processor and a storage for storing instructions, wherein when the instructions are executed, the processor implements the method for controlling a robot to take elevator according to any one of the above described.

In addition, according to a fourth aspect of the present invention, a robot system is also provided, which comprises: at least one robot arranged within a target area; and a controller, which is in communication with the robot and the elevator system as described above, and is configured to at least control the robot to board an elevator car of the elevator system according to an instruction of the elevator system.

In addition, according to a fifth aspect of the present invention, a computer-readable storage medium for storing instructions is further provided, wherein when the instructions are executed, the method for controlling a robot to take elevator according to any one of the above described is implemented.

From the following detailed description in combination with the accompanying drawings, the principles, features, characteristics, advantages and the like of the various technical solutions according to the present invention will be clearly understood. For example, as compared with prior art, the technical solutions of the present invention can effectively reduce or eliminate the risk of potential conflicts between the robot and passengers, can intelligently guide the robot to the target floor, and at the same time ensure a comfortable experience for the passenger when taking the elevator, achieving safe and stable operation of the elevator in a mixed loading environment of passengers and robot. The present invention has low application cost and strong practicability.

BRIEF DESCRIPTION OF THE DRAWINGS

The technical solutions of the present invention will be further described in detail below with reference to the accompanying drawings and embodiments. However, these drawings are designed merely for the purpose of explanation, are only intended to conceptually illustrate the structural configuration herein, and are not required to be drawn to scale.

DETAILED DESCRIPTION OF THE INVENTION

First, it is noted that the structural components, steps, characteristics, and advantages of the method for controlling a robot to take elevator, the system for controlling a robot to take elevator, the elevator system, the robot system, and the computer-readable storage medium of the present invention will be described below by way of example. However, all the description is not intended to limit the present invention in any way. Herein, the technical term “robot” refers to all man-made machine devices that are capable of performing a task automatically, and which may be used to replace or assist human in many types of affairs, such as sending documents, packages, food (such as fast food, drinks, fruits), etc.

In addition, for any single technical feature described or implied in the embodiments mentioned herein, or any single technical feature shown or implied in individual drawings, the present invention still allows for any combination or deletion of these technical features (or equivalents thereof) without any technical obstacle. Therefore, it should be considered that more embodiments according to the present invention are within the scope of the present invention. In addition, in order to simplify the drawings, identical or similar parts and features may be marked in only one or more places in the same drawing.

Figure 1:
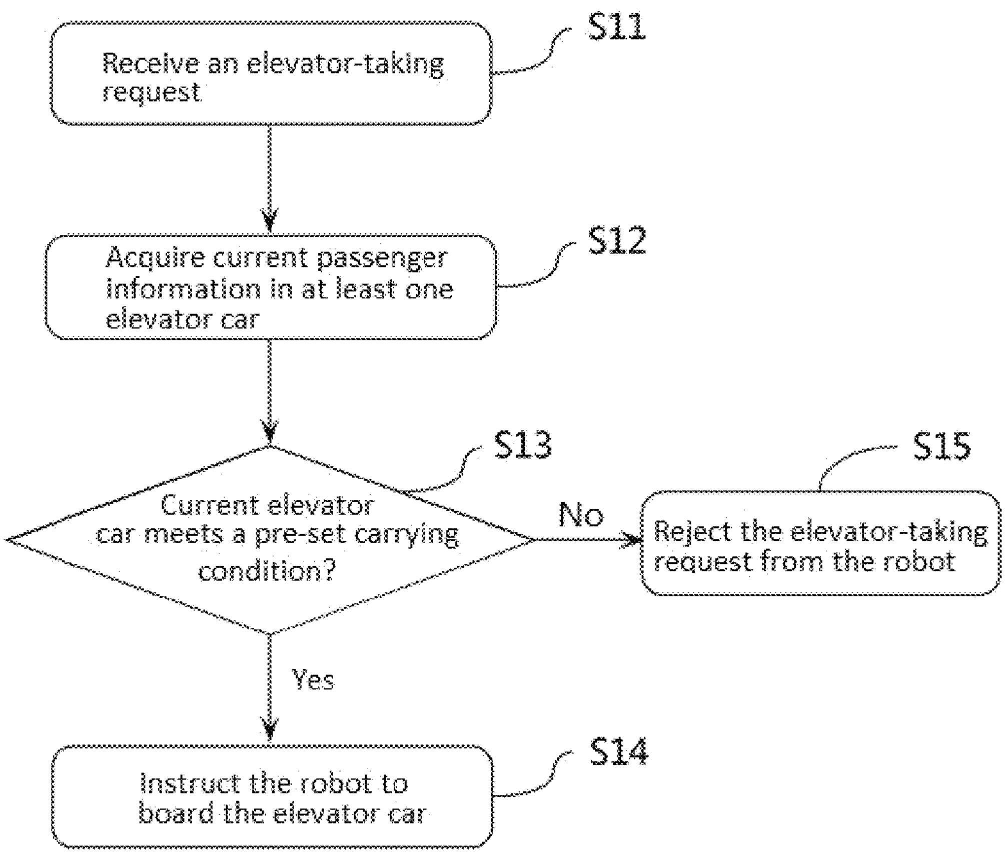
FIG. 1 is a schematic flowchart of an embodiment of a method for controlling a robot to take elevator according to the present invention.
Figure 2:
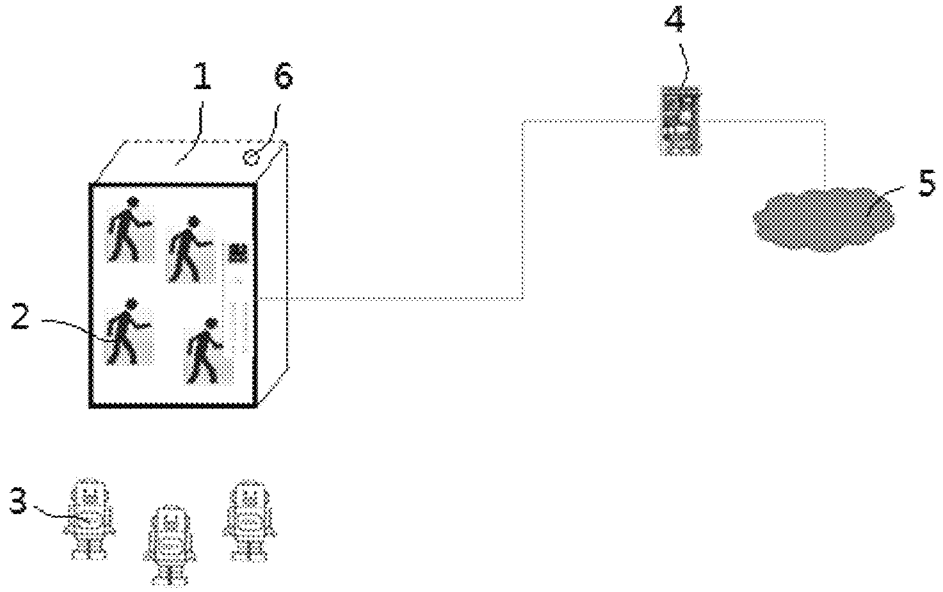
FIG. 2 is a schematic diagram of an application scenario of an embodiment of a method for controlling a robot to take elevator according to the present invention.
Figure 3:
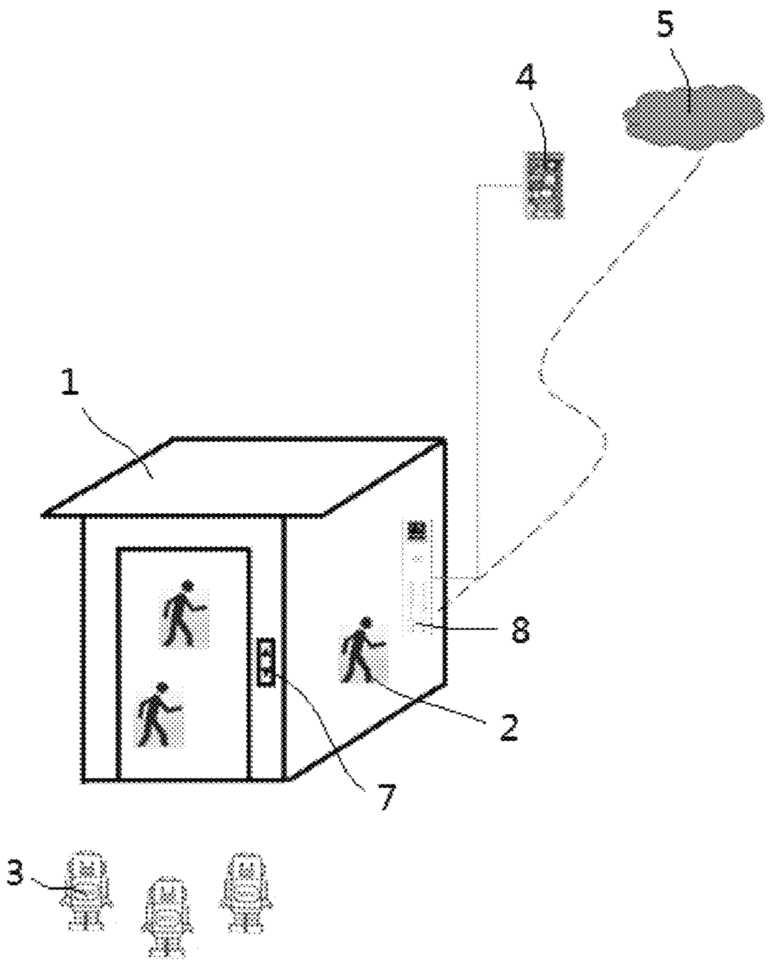
FIG. 3 is a schematic diagram of an application scenario of another embodiment of a method for controlling a robot to take elevator according to the present invention.

FIG. 1 shows a rough processing flow of an embodiment of a method for controlling a robot to take elevator according to the present invention, and FIG. 2 and FIG. 3 further show two different application scenarios of using the embodiment of the method of the present invention. In the following, the present invention will be described in detail with reference to these drawings.

In the embodiment shown in FIG. 1, the method for controlling the robot to take elevator may comprise the following steps S11 to S15:

In step S11, an elevator-taking request may be received from a robot 3. In actual application, the above elevator-taking request may be directly sent from the robot 3 to an elevator control system 4 for controlling an operation of an elevator car 1. For example, a person such as a work staff member may, according to the current task scheduling, operate the robot 3 to send the elevator-taking request to the elevator control system 4 to inform the elevator control system 4 of information such as a target floor that the robot 3 wishes to arrive. Of course, the above elevator-taking request may also be sent to the elevator control system 4 by relevant people operating a robot system for controlling the operation of the robot 3 according to the work task situation. That is, the present invention allows for sending the elevator-taking request of the robot 3 by any other feasible means such as operating the robot system, without being limited to sending the elevator-taking request to the elevator control system 4 from the robot 3 itself.

As for the robot 3, the specific set number, arrangement position, model, size, working power and the like may be flexibly selected, set, or adjusted according to application requirements. For example, one or more robots 3 may be arranged, for example, in a hallway of a building where the elevator is installed, on one or some floors (such as a floor with a relatively large demand for use or nearby floors), etc., thereby facilitating management, use, and maintenance of the robot 3. In this way, after the robots 3 are arranged as needed, they may be driven to carry their respective work tasks to the corresponding target floors according to the specific task assigning conditions. For example, after various types of objects are delivered to the building by personnel of different courier companies in different time periods and sorted and gathered according to the floor, they are handed over to the robots 3 which will take the elevator at appropriate times (for example, every other selectively settable time period such as 1 hour, 2 hours, etc. to avoid the peak hour of taking the elevator, e.g. rush hour, lunch time) so that the objects will be delivered altogether to the recipients of individual objects on the target floors. As such, not only the delivery efficiency can be greatly improved, but also frequent elevator scheduling is avoided, which can help save energy consumption and extend the service life of the elevator.

In specific applications, the robot 3 may communicate with the above-mentioned elevator control system 4 and a robot system (not shown). Such a communication connection may be implemented by any feasible wireless communication means alone or in any combination, such as Bluetooth, Wi-Fi, ZigBee, 4G, 5G, NB-IOT, etc. For the elevator control system 4 and the robot system, they may be arranged locally (for example, in the building where the elevator is installed) and/or in a cloud 5, which may be correspondingly set and selected according to specific needs of various applications, etc.

With continued reference to FIG. 1, in step S12, current passenger information in the elevator car 1 may be acquired. In different application situations, the elevator system may be equipped with one, two or more elevator cars 1. Therefore, in this case, current passenger information in one, multiple or all elevator cars 1 in the elevator system may be acquired according to the application requirements. Specifically, regarding the passenger information, the present invention allows for various forms of settings so that different application requirements can be sufficiently satisfied, which will be described exemplarily in detail hereinafter.

Then, in step S13, it can be determined whether the elevator car 1 presently meets a pre-set carrying condition (which may be set and adjusted according to different application requirements) according to the acquired current passenger information of the elevator car 1 so that a corresponding decision can be made on the previously received elevator-taking request from the robot 3 according to the determination result.

Specifically, if it is determined that the elevator car 1 meets the pre-set carrying conditions, then in step S14, a response is made to the elevator-taking request from the robot 3, indicating that the robot 3 can take the elevator car 1. According to the pre-set carrying condition, even if the robot 3 is allowed to enter the elevator car 1, there is no risk such as collision and conflict with a passenger 2 in the elevator car 1, so the passenger in an environment of taking the elevator together with the robot can also feel comfortable, and it is ensured that the elevator runs safely and stably in a mixed carrying environment.

On the contrary, if it is determined that the elevator car 1 does not meet the pre-set carrying condition, then in step S15, a response is made to the elevator-taking request from the robot 3 to reject the elevator-taking request, thus avoiding possible collision, conflict and the like between the passenger and the robot which causes the passenger to be dissatisfied and complain.

As for the above pre-set carrying condition, different optional ways may be used in different embodiments to set it.

For example, in some embodiments, a ratio of a current load weight of the elevator car 1 and a rated load weight thereof may be determined based on the above acquired passenger information, and if the ratio does not reach a pre-set value (for example, a selectable range may be 15%-30%), then it means that there is no risk of collision or conflict between the robot 3 and the passenger 2 or this risk is quite small, so the robot 3 can be allowed to enter the elevator car 1 to take the elevator together with the passenger 2. On the other hand, if the ratio reaches the above pre-set value, the elevator-taking request can be rejected so as to avoid possible collision, conflict and the like between the robot 3 and the passenger 2 which will cause undesired interference to the passenger and affect the passenger's comfort in taking the elevator.

For another example, in some embodiments, the number of passengers who have entered the elevator car 1 may be determined based on the above acquired passenger information, and then the number may be compared with a corresponding pre-set value (which may be set based on a specific carrying capacity condition the elevator car) to determine whether the current remaining space of the elevator car 1 is sufficient to allow the robot 3 to enter without causing these undesired risks as described above, thereby deciding whether to accept or reject the elevator-taking request from the robot 3.

As for the above passenger information, in an optional situation, as shown in FIG. 2, one or more sensors 6 may be used to obtain it. For example, such sensors may be implemented by one or more of an imaging sensor, a video sensor, an acoustic sensor, an infrared sensor, a depth sensor, and a weight sensor, and their arrangement positions, set numbers, and types may be flexibly set in specific applications. For example, the present invention allows one or more sensors to be arranged on the hallway, floors, the top of the elevator car 1, a side wall of the elevator car 1, or any other suitable location, so as to better detect the desired data information.

It should be understood that, without departing from the spirit of the present invention, the method of the present invention is subject to various possible flexible designs, changes, and adjustments according to the actual application conditions. For example, as discussed above, it is possible to reject the elevator-taking request from the robot 3 in some cases. In this situation, the rejection result may be fed back to the robot 3 and/or the robot system, and then the robot 3 and/or the robot system re-initiates the elevator-taking request. However, in an optional situation, in a case that the elevator-taking request from the robot 3 is rejected, the robot 3 may be instructed to wait in a waiting area to wait for a next elevator car 1. That is, when the next elevator car 1 has already met the pre-set carrying condition, the robot 3 is allowed to enter the car and take the elevator.

In addition, in an optional situation, the above passenger information may comprise various operations of the passenger on the elevator (for example, the elevator door may be opened, closed, or prevented from being closed and the target floor can be selected by clicking or pressing the corresponding elevator control button, etc.), and a priority level of the passenger 2's operation on the elevator may be set to be higher than a priority level of the robot 3's operation on the elevator, which will help to further achieve the object of the present invention, and effectively overcome or even eliminate the problems of a conflict between the robot and the passenger which causes the passenger to complain. By way of example, as shown in FIG. 3, for example, when any passenger 2 located in the elevator car 1 sends a request to close the elevator door, the request may be sent by the passenger 2 by operating a human-machine interface disposed in the elevator car 1 (such as a door-closing button on a panel 8 in the elevator car 1), and the request to close the elevator door will be detected as the current passenger information. Since a priority level of the passenger 2's operation on the elevator is higher, even if the robot 3 has sent a request to open the elevator door to the elevator system (for example, a door-opening button on a panel 7 disposed on the floor has been pressed), the request to open the elevator door will still be rejected, thereby avoiding a possible situation in which the elevator door cannot be closed since the above door-opening button is pressed by the robot 3 for a long time to cause the robot 3 and the passenger 2 to fall into a deadlock, resulting in very frustrated passengers having negative emotions such as complaining. By adopting the above processing, the example of the method according to the present invention enables an elevator operation request made by the robot 3 that may conflict with the passenger 2 to be released in a timely and effective manner, thus ensuring that the elevator system can maintain a safer and smoother running state.

As an aspect obviously superior to the prior art, the present invention also provides a system for controlling a robot to take elevator, which may comprise a processor, and a storage having instructions stored therein, wherein when the instructions are executed, the processor in the system for controlling the robot to take elevator implements the method for controlling the robot to take elevator provided by the present invention, so that the above-described obvious technical advantages of the solutions of the invention over the prior art can be presented. The processor and the storage may be implemented by using any suitable components, chips, or modules.

In addition, according to the design concept of the present invention, an elevator system is also provided, which may comprise an elevator having one or more elevator cars, and the system for controlling a robot to take elevator as described above. By employing such an elevator system, many problems existing in the prior art, such as those occurring when a robot and a passenger take an elevator simultaneously, can be effectively solved.

Furthermore, the present invention also provides a robot system, which may comprise one or more robots and a controller for controlling an operation of the robot. As for the robot, it may be arranged in any possible target area such as a hallway of a building, one or more floors of a building. As for the controller, it is configured to communicate with the robot and the above described elevator system so that it may be at least used to control the robot to board the elevator car of the elevator system according to an instruction of the elevator system. It should be understood that the controller may also be referred to as a control device, a management system and the like in actual applications, and may be independently set or integrated into the elevator system or other devices, apparatuses, or systems.

In addition, the present invention also provides a computer-readable storage medium for storing instructions that, when executed, can implement the method for controlling the robot to take elevator according to the present invention. The computer-readable storage medium may be any type of component, module or device capable of storing instructions, and may include, but is not limited to, read-only storage (ROM), random access storage (RAM), erasable and programmable read-only storage (EPROM), etc.

The method for controlling a robot to take elevator, the system for controlling a robot to take elevator, the elevator system, the robot system, and the computer-readable storage medium according to the present invention are explained in detail above by way of example only. These examples are only used to explain the principle of the present invention and embodiments thereof, and are not intended to limit the present invention. Those skilled in the art may also make various modifications and improvements without departing from the spirit and scope of the present invention. Therefore, all equivalent technical solutions shall fall within the scope of the present invention and be defined by the claims of the present invention.

What is claimed is:

1. A method for controlling a robot to take elevator, the method comprising:

receiving an elevator-taking request from a robot;

acquiring current passenger information in at least one elevator car; and determining whether the elevator car meets a pre-set carrying condition according to the acquired current passenger information: if yes, instructing the robot to board the elevator car in response to the elevator-taking request; otherwise, rejecting the elevator-taking request.

2. The method for controlling the robot to take elevator according to claim 1, further comprising: in case that the elevator-taking request is rejected, instructing the robot to wait in a waiting area until it is allowed to board a next elevator car, wherein the current passenger information in the next elevator car meets the carrying condition.

3. The method for controlling the robot to take elevator according to claim 1, wherein the current passenger information comprises the passenger's operation on the elevator, and a priority level of the passenger's operation on the elevator is set to be higher than a priority level of the robot's operation on the elevator.

4. The method for controlling the robot to take elevator according to claim 3, wherein the passenger's operation on the elevator comprises: sending a request to close an elevator door by the passenger; and after the request to close the elevator door is detected, rejecting a request to open the elevator door sent by the robot.

5. The method for controlling the robot to take elevator according to claim 1, wherein the elevator-taking request is sent from the robot to an elevator control system for controlling an operation of the elevator car, or sent via a robot system for controlling an operation of the robot to the elevator control system.

6. The method for controlling the robot to take elevator according to claim 5, wherein the elevator control system is arranged locally and/or in a cloud, and/or the robot system is arranged locally and/or in a cloud.

7. The method for controlling the robot to take elevator according to claim 1, wherein the passenger information is acquired by using one or more sensors comprising one or more of an imaging sensor, a video sensor, an acoustic sensor, an infrared sensor, a depth sensor and a weight sensor.

8. The method for controlling the robot to take elevator according to claim 1, wherein the passenger information comprises a ratio of a current load weight of the elevator car and a rated load weight thereof, and if the ratio reaches a pre-set value, the elevator-taking request is rejected.

9. The method for controlling the robot to take elevator according to claim 8, wherein a range of the pre-set value is 15%-30%.

10. The method for controlling the robot to take elevator according to claim 1, wherein the robot is arranged in a hallway and/or on at least one floor of an elevator installation place, and the robot is in wireless communication with an elevator control system for controlling an operation of the elevator car and/or a robot system for controlling an operation of the robot.

11. A system for controlling a robot to take elevator, comprising a processor and a storage for storing instructions, wherein when the instructions are executed, the processor implements the method for controlling the robot to take elevator according to claim 1.

12. An elevator system, comprising:

an elevator having at least one elevator car; and a system for controlling a robot to take elevator, which is in communication with the elevator and comprises a processor and a storage for storing instructions, wherein when the instructions are executed, the processor implements the method for controlling the robot to take elevator according to claim 1.

13. A robot system, comprising:

at least one robot arranged within a target area; and a controller, which is in communication with the robot and the elevator system according to claim 12, and is configured to at least control the robot to board an elevator car of the elevator system according to an instruction of the elevator system.

14. A computer-readable storage medium for storing instructions, when being executed, to implement the method for controlling the robot to take elevator according to claim 1.

* * * * *